United States Patent [19]

Matlow

[11] Patent Number: 4,719,286
[45] Date of Patent: Jan. 12, 1988

[54] CLASS OF CONDUCTIVE POLYMERS

[75] Inventor: Sheldon L. Matlow, San Jose, Calif.

[73] Assignee: Northrop Corporation, Hawthorne, Calif.

[21] Appl. No.: 711,984

[22] Filed: Mar. 14, 1985

[51] Int. Cl.$^4$ ............................................. C08G 79/14
[52] U.S. Cl. ...................................... 528/362; 252/500; 522/173; 528/381; 528/395; 528/398
[58] Field of Search ..................... 252/500; 522/173; 528/362, 395, 381, 398

[56] References Cited

U.S. PATENT DOCUMENTS

| | | | |
|---|---|---|---|
| 3,023,164 | 2/1962 | Lawton et al. | 252/49.7 |
| 3,060,189 | 10/1962 | Stocker et al. | 260/341.5 |
| 3,218,205 | 11/1965 | Ruehrwein | 252/62.3 |
| 3,245,965 | 4/1966 | Tuemmier | 260/78.4 |
| 3,267,115 | 8/1966 | Kator | 260/314 |
| 3,293,075 | 12/1966 | Wildi | 526/241 |
| 3,408,310 | 10/1968 | McConnell | 252/500 |
| 3,543,394 | 12/1970 | Matlow | 29/584 |
| 3,615,558 | 10/1971 | Carreirn | 204/181 |
| 3,896,184 | 7/1975 | Bergfjord et al. | 260/669 |
| 3,903,107 | 9/1975 | Griffiths et al. | 260/314.5 |
| 4,104,466 | 8/1978 | Tsuchida et al. | 542/433 |
| 4,175,981 | 11/1979 | Loutfy et al. | 357/8 |
| 4,204,216 | 5/1980 | Heeger et al. | 357/8 |
| 4,269,738 | 5/1981 | Pez et al. | 357/8 |
| 4,359,411 | 11/1982 | Kim et al. | 252/500 |
| 4,376,659 | 3/1983 | Castro | 357/16 |

OTHER PUBLICATIONS

F. H. Mosher et al.: *Phthalcyanine Compounds*, Amer. Chem. Society Pub. (1963), pp. 332–336.
J. P. Collman et al.: *Principles and Applications of Organotransition Metal Chemistry* (1980), pp. 24–31, University Sci. Books, pub.
Zhorin et al.: CA 98 180,166p.

*Primary Examiner*—Veronica P. Hoke
*Attorney, Agent, or Firm*—Terry J. Anderson; Robert B. Block

[57] ABSTRACT

A conductive polymer is set forth which comprises a plurality of interconnected units. Each unit comprises a generally centrally positioned moiety and a ligand or set of ligands having a total dentation capability of three or more non-coplanar dentations and being positioned about the centrally positioned moiety, at least two of the dentations being parts of conjugated systems. The units are interconnected by having at least one ligand in common and the conjugation of the conjugated systems extend from one centrally positioned moiety to an adjacent centrally positioned moiety. Through proper selection of ligands and centrally positioned moieties, conductive polymers of various desired characters including intrinsically conductive polymers, p-type semiconductor polymers, n-type semiconductor polymers, p-type metal conducting polymers and a n-type metal conducting polymers can be constructed.

8 Claims, 3 Drawing Figures

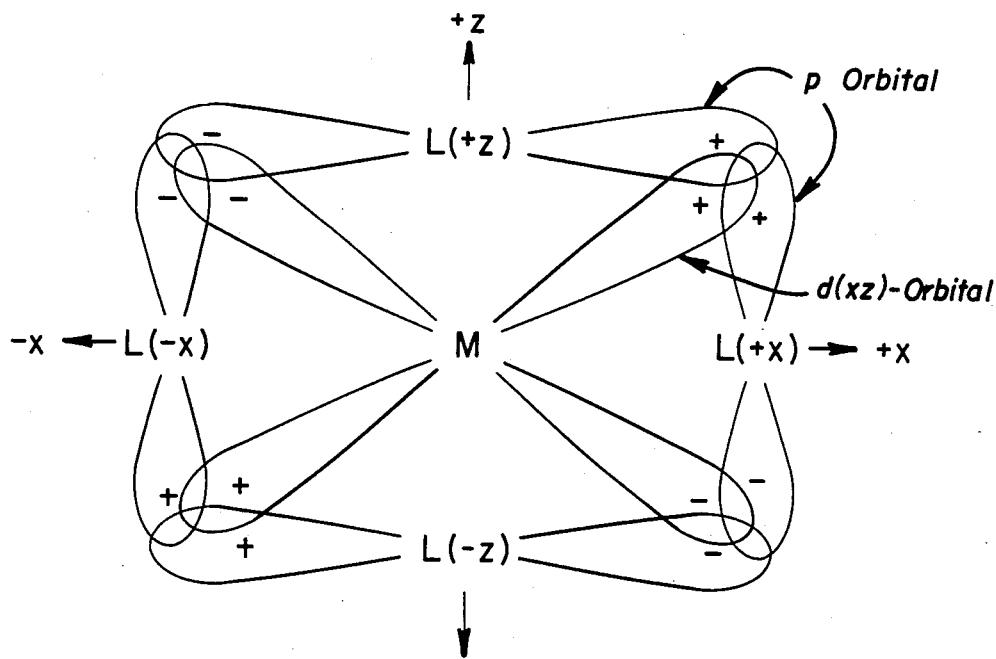
FIGURE 1  d(xz)-LIGAND INTERACTIONS
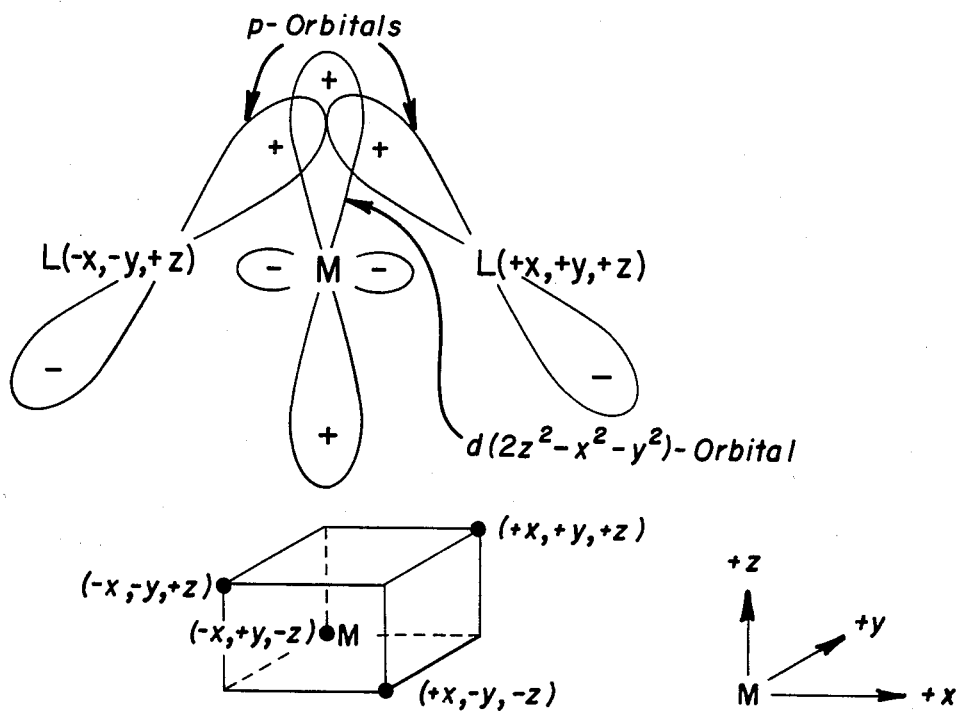
FIGURE 2  $d(2z^2-x^2-y^2)$-LIGAND INTERACTION

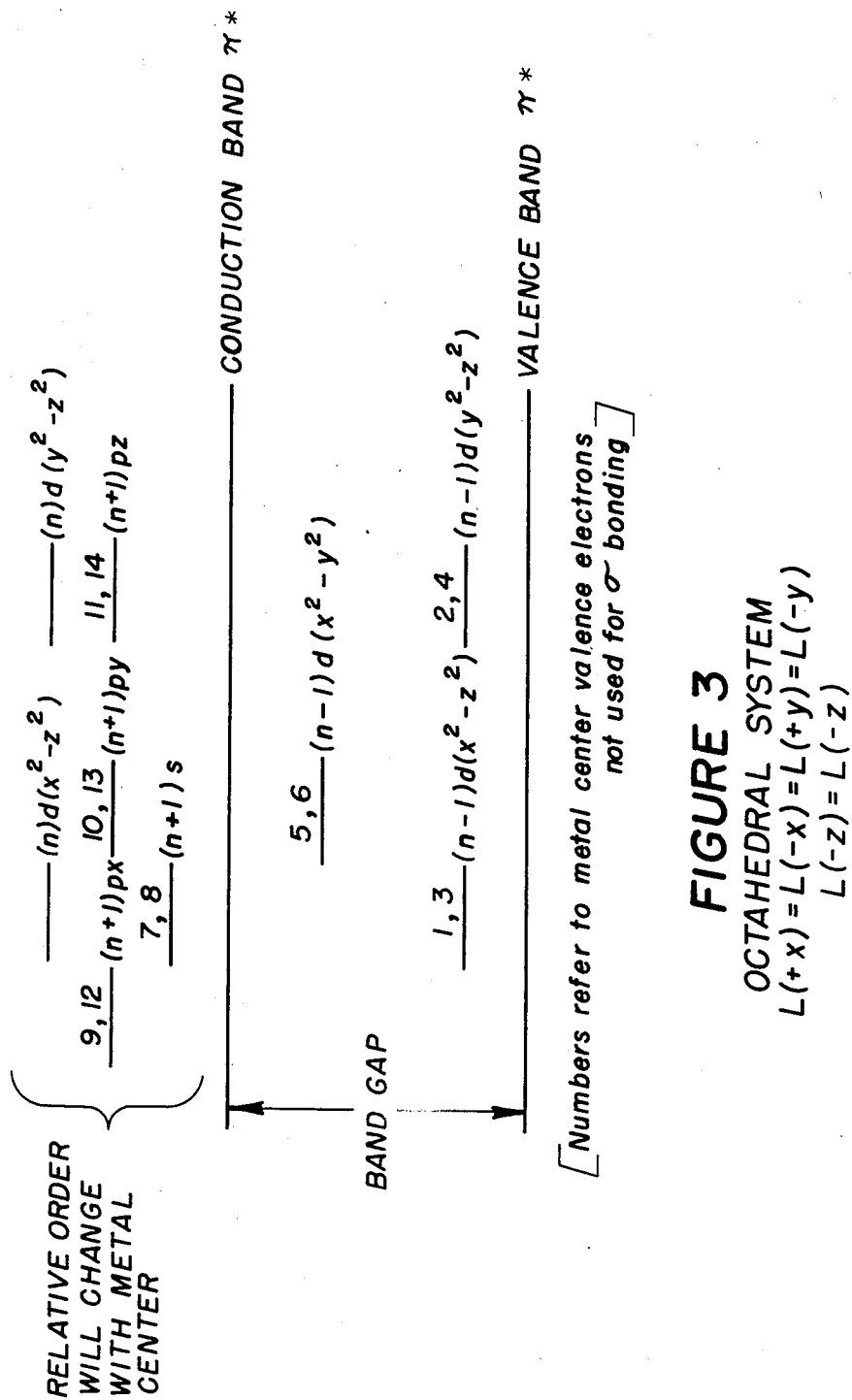

CLASS OF CONDUCTIVE POLYMERS

TECHNICAL FIELD

The invention relates to conductive polymers including those polymers which have by intrinsic conductivity p-type semiconducting properties, n-type semiconducting properties, p-type metal conducting properties and n-type metal conducting properties. The polymers are useful to replace metallic conductors, silicon semiconductors, and the like.

BACKGROUND ART

At the present time, silicon is the semiconductor of choice for the fabrication of most semiconductor devices including, but not limited to, microprocessors and random access memories (RAM's). The use of silicon, however, severely limits the parameters which can be used in the design of such devices. When using silicon, for example, one is limited to a band gap of 1.1 electron volts. The p-n junction profiles are limited to the graded junction produced by diffusion and the step junction produced by epitaxy. Since methods are not available for varying the band gap of silicon or for obtaining junction profiles other than graded or step, device design engineers have had no incentive to consider other possibilities for their designs. A further limitation of the use of silicon is a need for metalization to make low resistance ohmic contacts for the various regions of the devices.

Non-metallic conductive polymers and other materials are, of course, known to the art. For example, it is well known that graphite is a very good conductor in the plane of the $\pi$-bonded carbon atoms. It is conduction between the planes of graphite which is not very good. The distance between adjacent carbon atoms in the plane is 1.42 Å, whereas the distance between the planes is 3.41 Å. The distance between adjacent carbon atoms in benzene is 1.39 Å, for which the value of the overlap integral for carbon $2p_z$-orbitals (the z-axis is perpendicular to the plane) is about 0.25. Since each carbon atom in graphite has two $2p_z$-orbitals (differing only by their spin quantum numbers) and only one electrode available for them, conductivity is possible for graphite within the plane. However, a graphite-like system is not satisfactory for the fabrication of semiconductor devices since it is only a 2-dimensional conductor. Linear conducting polymers are also known but, since they only conduct linearly, they are also not well suited for semiconductor devices or for many other uses wherein various types of conductive devices are needed.

It would be highly desirable to provide a new type of conductive polymer which would allow a great reduction in the design limitations which presently face device design engineers. It would also be desirable to provide the engineers with a means of varying the band gap of the semiconducting or metallic conducting material at will. It would still further be advantageous to provide the design engineer with means to vary controllably conductivity and conductivity type (p-type, n-type or metallic) at will. It would be still further advantageous to provide the design engineer with means of controllably producing various different types of junction profiles. Still further, it would be desirable to provide the design engineer with a means of producing metallic regions within a device as well as on its surface.

DISCLOSURE OF INVENTION

The present invention is directed to overcoming one or more of the problems as set forth above.

In accordance with an embodiment of the present invention a conductive polymer is provided which comprises a plurality of interconnected units. Such units comprise a generally centrally positioned moiety and a ligand or set of ligands having a total dentation capability of 3 or more non-coplanar dentations and being positioned about the centrally positioned moiety, at least two of the dentations being parts of conjugated systems. Such units are interconnected by having at least one ligand in common and the conjugation of the conjugated systems must extend from one centrally positioned moiety to an adjacent centrally positioned moiety.

The types of conductive polymers which form a part of the present invention provide all of the advantages discussed above. That is, they will allow a great reduction of the design limitations which principally face device design engineers by providing the engineers with means of varying the band gap of the semiconducting or metallic material at will, means of controllably varying the conductivity and conductivity type (p-type, n-type or metallic) at will, means of controllably producing various different types of junction profiles, and means of producing metallic regions within a semiconductor device as well as on its surface.

BRIEF DESCRIPTION OF DRAWINGS

FIG. 1 conceptually illustrates orbital overlaps in systems in accordance with an embodiment of the present invention;

FIG. 2 conceptually illustrates interactins of orbitals of dentation atoms in accordance with an embodiment of the present invention; and FIG. 3 conceptually illustrates the band structure for a particular octahedral system.

BEST MODE FOR CARRYING OUT THE INVENTION

In order to understand how the class of polymers set out herein can permit such a wide diversity of design parameters as is discussed above it is useful to understand what is required for an electron to be transferred from one atom to another in the presence of an external electric field. This is the means by which electronic conduction occurs in the solid state. From quantum mechanics it is known that it is not sufficient to state that an electron is in an atom. It is necessary to state which atomic orbital is occupied by the electron. Thus, it is necessary to determine what is required for an electron in an atomic orbital $u_A$ of atom A to be transferred to atomic orbital $u_B$ of atom B in the presence of an external electric field, E.

There are four conditions which the system must satisfy for the desired electron transfer to occur. First, there must be an electron in $u_A$ initially. It is clear that if no electron is present in $u_A$, it cannot be transferred to $u_B$. Second, $u_B$ must be empty initially. Since an electron is a Fermi-Dirac particle, no two electrons in a given system can have the same set of quantum numbers. Since specifying $u_B$ specifies all of the quantum numbers of an electron in $u_B$ (including electron spin), $u_B$ can have, at most, one electron. If an electron is already in $u_B$, a second electron cannot enter that atomic orbital. Third, there must be sufficient energy available to allow the transfer of the electron to occur. The energy requirement may be met by energy taken from the electric field, by energy taken from the phonon field (thermal energy), or by energy taken from both fields. Finally, the overlap integral of the atomic orbital $u_A$ and $u_B$ must be sufficient to provide the desired conductivity. Generally, this integral, usually represented as $$\int u_A{}^\circ u_B d\tau$$

must be large, i.e., generally must be greater than about 0.1 The electron mobility, $\mu$, in a solid is a strong function of the size of such integrals. It should be noted that, when the overlap integrals are large, the independent atomic orbital model is not very good, and the molecular orbital model should be used in preference thereto. When the LCAO-MO (linear combinations of atomic orbitals-molecular orbitals) model is used, the atomic overlap integrals appear in the equation for electron mobility.

In accordance with the present invention a conductive polymer is provided which in certain instances is conducting as well. These terms are distinguished in that the term "conductive polymer" refers to a polymer which may or may not be conducting but does have the ability to conduct. On the other hand, the term "conducting polymer" is utilized to designate a polymer which actually has conducting properties, either metallic or semiconducting.

The conductive polymers in accordance with the present invention comprises a plurality of interconnected units. These units each include a generally centrally positioned moiety. The moiety will normally be an atom or an ion. The term "atom or ion" is utilized to include those cases wherein the moiety does not have a charge and does have a charge, respectively. Indeed, there are many instances wherein there is disagreement in the scientific community as to whether or not a particular moiety is an atom or an ion in a particular complex. The phrase "atom or ion" is therefore used to indicate that the conductive polymers of the present invention can be made whether or not there is a charge on the centrally positioned moiety.

A ligand or set of ligands having a total dentation capability of 3 or more non-coplanar dentations and being positioned about the centrally positioned moiety, with at least 2 of the dentations being parts of the conjugated systems, also forms a part of the conductive polymer of the present invention. The term "dentation" is utilized in its usual sense to indicate portions of the ligand or set of ligands which can bond to an atom or ion. The terms "conjugated" and "conjugation" are utilized in their usual chemical sense.

It is essential to the practice of the present invention that the various interconnected units be interconnected by having at least one ligand in common and that the conjugation of the conjugated systems extend from one centrally positioned moiety to an adjacent centrally positioned moiety. The conjugated systems, in effect, provide a conductivity path by way of $\pi$-orbitals through which the electrons can, in effect, flow.

Dependent upon the choice of materials for the centrally positioned moiety, the ligands, and the like, the band gap, defined as the energy difference between the edge of the valence band and the conduction band, can be controlled. For example, this gap can be controlled to be sufficiently small so that large numbers of electrons from the valence bond are in the conduction band at ambient temperature whereby the polymer is intrinsically conducting. The term "ambient temperature" is used relatively broadly and it should be realized that a material may be intrinsically conducting at one temperature, for example, at room temperature (which would then be ambient temperature), while it would not be conductive at another ambient temperature, for example, at or near absolute zero, wherein the number of valence band electrons excited into the conduction band will not be sufficiently large for significant intrinsic conduction.

A conductive polymer can also be prepared wherein the centrally positioned atom or ion has an available d- or f-orbital which is empty and which lies, in energy, slightly above the top of the valence band. In such an instance, the polymer exhibits p-type semiconductor behavior. The conductive polymer can be prepared whereby the centrally positioned atom or ion has an available d- or f-orbital which is occupied and which lies slightly below, in energy, the bottom of the conduction band whereby the polymer exhibits n-type semiconductor behavior.

The conductive polymer can also be prepared wherein the centrally positioned atom or ion has an available d- or f-orbital which is empty and which lies in the valence band whereby the polymer exhibits p-type metal conductor behavior.

Furthermore, the conducting polymer can be prepared whereby the centrally positioned atom or ion has an available d- or f-orbital which is occupied and which lies in the conduction band whereby the polymer exhibits n-type metal conductor behavior.

It will be apparent that the present invention is quite broad and sets forth a nearly limitless class of conducting polymers which are, however, all distinguished by having certain essential features in common as discussed herein.

A number of different geometries can be utilized to provide conductive polymers in accordance with the present invention. Basically, it has been found that 3 dimensional conduction, which is essential to providing the desired conductive polymer, can be obtained if atoms or ions with valence level d-orbitals or f-orbitals are used in a "proper" way. Atoms or ions which have valence d-orbitals are preferred over atoms or ions which have valence f-orbitals and the following discussion, for brevity and clarity will be limited to such cases without so limiting the invention itself.

Before investigating what a "proper way" is, it will be useful to indicate the broad range of atoms and ions which have valence d-orbitals. A useful indicator of the presence of valence level d-orbitals is the presence of octahedral coordination. Octahedral coordination is a result of $d^2sp^3$ or $sp^3d^2$ hybridization. The first case occurs when the n quantum number of the d-orbitals is one less than the n quantum number of the s- and p-orbitals. The second case occurs when the n quantum number is the same for all three types of orbitals. Table I set forth a broad listing of elements which have valence d-orbitals. The table, for brevity, does not go beyond elements in the first row of the transition elements.

TABLE I

| | Octahedral Coordination | |
|---|---|---|
| Element | Oxidation State | Examples Of Octahedral Coordination |
| Mg | II | $[Mg(H_2O)_6]^{2+}$, $[Mg(CH_3COCH_3)_6]^{2+}$ |

TABLE I-continued
Octahedral Coordination

| Element | Oxidation State | Examples Of Octahedral Coordination |
|---|---|---|
| | | [Mg(CH$_3$CH$_2$OH)$_6$]$^{2+}$, [Mg(NH$_3$)$_6$]$^{2+}$ |
| Al | III | [Al(H$_2$O)$_6$]$^{3+}$, AlF$_6$$^{3-}$ |
| S | O | Si(bipy)$_3$$^a$ |
| | IV | SiF$_6$$^{2-}$ |
| P | V | PF$_6$$^-$ |
| S | IV | SF$_5$$^-$ ($\psi$-octahedral) |
| | VI | RSF$_5$ |
| Ca | II | [Ca(NH$_3$)$_6$]$^{2+}$, [Ca(dien)$_3$](ClO$_4$)$_2$$^b$ |
| Sc | III | [Sc(NCS)$_2$ (bipy)$_2$]$^{+a}$ |
| Ti | −I | [Ti(bipy)$_3$]$^{-a}$ |
| | O | Ti(bipy)$^a$, Ti(CO)$_6$ |
| | II | TiCl$_2$ |
| | III | TiF$_6$$^{3-}$, [Ti(H$_2$O)$_6$]$^{3+}$ |
| | IV | TiF$_6$$^{2-}$, TiO$_2$ |
| V | −I | V(CO)$_6$$^{2-}$ |
| | O | V(CO)$_6$, V(bipy)$_3$$^a$ |
| | I | [V(bipy)$_3$]$^{+a}$ |
| | II | [V(H$_2$O)$_6$]$^{2+}$, [V(CN)$_6$]$^{4-}$ |
| | III | [V(NH$_3$)$_6$]$^{3+}$ |
| | IV | K$_2$(VCl$_6$), V(acac)$_2$Cl$_2$$^c$ |
| | V | VF$_6$$^-$ |
| Cr | −I | Na$_2$[Cr$_2$(CO)$_{10}$] |
| | O | Cr(CO)$_6$, Cr(bipy)$_3$$^a$ |
| | I | [Cr(CNR)$_6$]$^+$ |
| | II | CrF$_2$ |
| | III | [Cr(NH$_3$)$_6$]$^{3+}$, K$_3$[Cr(CN)$_6$] |
| | IV | K$_2$(CrF$_6$) |
| | V | K$_2$(CrOCl$_5$) |
| Mn | −II | [MnPc]$^{2-d}$ |
| | −I | [MnPc]$^{-d}$ |
| | O | Mn(CO)$_{10}$ |
| | I | [Mn(CNR)$_6$]$^+$ |
| | II | [Mn(H$_2$O)$_6$]$^{2+}$ |
| | III | Mn(acac)$_3$$^c$ |
| | IV | MnCl$_6$$^{2-}$ |
| Fe | O | [Fe(CO)$_5$H]$^+$ |
| | I | [Fe(H$_2$O)$_5$NO]$^{2+}$ |
| | II | [Fe(H$_2$O)$_6$]$^{2+}$, [Fe(CN)$_6$]$^{4-}$ |
| | III | Fe(acac)$_3$$^c$, FeCl$_6$$^{3-}$ |
| | IV | [Fe(diars)$_2$Cl$_2$]$^{2+e}$ |
| Co | I | [Co(bipy)$_3$]$^{+a}$ |
| | II | [Co(NH$_3$)$_6$]$^{2+}$ |
| | III | [Co(CN)$_6$]$^{3-}$, CoF$_6$$^{3-}$ |
| | IV | CoF$_6$$^{2-}$ |
| Ni | II | [Ni(NH$_3$)$_6$]$^{2+}$, [Ni(bipy)$_3$]$^{2+a}$ |
| | III | NiF$_6$$^{3-}$ |
| | IV | [Ni[Se$_2$C$_2$(CN)$_2$]$_3$]$^{2-f}$, K$_2$(NiF$_6$) |
| Cu | II | K$_2$Pb[Cu(NO$_2$)$_6$] |
| | III | K$_3$(CuF$_6$) |
| Zn | II | [Zn(NH$_3$)$_6$]$^{2+}$ |
| Ga | III | Ga(acac)$_3$$^c$ |

$^a$bipy = 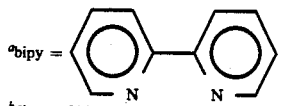

$^b$dien = H$_2$N(CH$_2$CH$_2$NH)$_2$H $^c$acac = 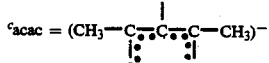

$^d$Pc = phthalocyanate anion
$^e$diars = o-C$_6$H$_4$(AsMe$_2$)$_2$ $^f$Se$_2$C$_2$(CN)$_2$ = 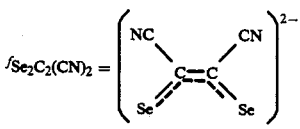

For the sake of specificity it will be assumed that the d-orbitals used in the d$^2$sp$^3$ hybridization are the d(2z$^2$−x$^2$−y$^2$) and the d(x$^2$−y$^2$) orbitals. The d(2z$^2$−x$^2$−y$^2$) orbital is usually abbreviated as "d(z$^2$)". There are three such d-orbitals, d(x$^2$−y$^2$), d(x$^2$−z$^2$) and d(y$^2$−z$^2$). Only two are linearly independent. The d(2z$^2$−x$^2$−y$^2$) and the d(x$^2$−y$^2$) orbitals are the ones which are usually chosen. This leaves the d(xy), d(xz) and d(yz) orbitals for $\pi$-bonding. If all six ligands (or the six dentations if there are multi-dentate ligands) are equivalent, then these orbitals are equal in energy.

All ligands are assumed to be conjugated systems or parts of conjugated systems. Thus, the atoms which are $\sigma$-bonded to the d$^2$sp$^3$ hybridized atom have p-orbitals available for $\pi$-bonding. The interrelationships among the various orbitals are shown in FIG. 1. Because of the three orbital overlaps shown in FIG. 1, an electron in the L(−x) ligand can be transported into the L(+z) ligand in the presence of an appropriately directed external electric field.

In the case of tetrahedral coordination the hybridization is sp$^3$ or d$^3$s. If one takes the edges of the circumscribed cube as defining the x, y, z-axes in the sp$^3$ case, the five d-orbitals are split into the d(2z$^2$−x$^2$−y$^2$) orbitals at one energy and the d(xy), d(xz) and d(yz) orbitals at a higher energy. In the d$^3$s case, the hybridization is d(xy)d(xz)d(yz)s. The unused d-orbitals, the d(2z$^2$−x$^2$−y$^2$) and the d(x$^2$−y$^2$) orbitals, are at the same energy. The higher lying triplet in this case is the p(x), p(y), p(z) triplet. The d(2z$^2$−x$^2$−y$^2$)-ligand interaction for tetrahedral coordination is shown in FIG. 2.

Referring to FIG. 2, the four ligand dentation atoms are at (+x, +y, +z), (−x, −y, +z), (+x, −y, −z) and (−x, +y, −z). The p-orbitals of the first two dentation atoms interact with the +z lobe of the d(2z$^2$−x$^2$−y$^2$)-orbital. The p-orbitals of the other two interact with the −z lobe of the d(2z$^2$−x$^2$−y$^2$)-orbital. Similar interactions occur with the d(x$^2$−y$^2$)-orbital.

It follows that other such three-center interaction systems can be set up for five-coordination systems through eight-coordination systems. Some of these systems are listed in Table II. Since the weak $\pi$-bonding systems do not yield good conductivities, the preferred geometries are tetrahedral, trigonal bipyramidal, tetragonal pyramidal, octahedral, trigonal dodecahedral and the square faces bicapped trigonal prismatic.

TABLE II
Coordination Systems

| Coordination Number | Geometry | Hybridization | Orbitals Available For Bonding |
|---|---|---|---|
| 4 | Tetrahedral | sp$^3$ | d$^2$ |
| | | d$^3$s | d$^2$ |
| 5 | Trigonal bipyramidal | dsp$^3$ | d$^2$ |
| | | d$^2$sp | d$^2$ |
| | Tetragonal pyramidal | d$^2$sp$^2$ | d |
| | | d$^4$s | d |
| | | d$^2$p$^3$ | d |
| | | d$^4$p | d |
| 6 | Octahedral | d$^2$sp$^3$ | d$^3$ |
| | Trigonal prismatic | d$^4$sp | p$^2$d (weak) |
| | | d$^5$p | p$^2$s (weak) |
| | Trigonal antiprismatic | d$^3$p$^3$ | sd (weak) |
| 7 | Face Capped octahedral | d$^3$sp$^3$ | d$^2$ (weak) |
| | | d$^5$sp | p$^2$ (weak) |
| | Square face capped trigonal prismatic | d$^4$sp$^2$ | dp (weak) |
| | | d$^4$p$^3$ | ds (weak) |
| | | d$^5$p$^2$ | ps (weak) |
| 8 | Trigonal dodecahedral | d$^4$sp$^3$ | d |
| | Square Antiprismatic | d$^5$p$^3$ | s (weak) |
| | Square Faces bicapped tri- | d$^5$sp$^2$ | p |

TABLE II-continued

| Coordination Number | Geometry | Hybridization | Orbitals Available For Bonding |
|---|---|---|---|
| | gonal prismatic | | |

The octahedral system will now be discussed further for the purpose of understanding. The relative energies of the three d-orbitals which are not used for $\sigma$-bonding will depend on the nature of the six ligands which are $\sigma$-bonded to the metal center. For the sake of specificity, it shall be assumed that the four ligands in the x, y-plane are identical and that the two ligands on the z-axis are identical. In this case, the $d(x^2-y^2)$-orbital will be higher in energy than the $d(x^2-z^2)-d(y^2-z^2)$ doublet. FIG. 3 illustrates the band structure for such a case. If the central moiety is a member and from the set of elements from Mg through S (or possibly Cl), the (n) d-orbitals apply. For the element set Ca through Se, as well as the later periods, the (n−1) d-orbitals apply. If the center moiety is a $Mg^{2+}$, no valence electroons are available. Thus, the localized levels in the conduction band will be empty. If the band gap energy is large compared with $k_oT$ ($k_o$, Boltzmann's Constant; T, absolute temperature of the system), the polymer will be an insulator.

If the central moiety is the metal ion $Ca^{2+}$, no valence electrons are available. In this case, however, the (n−1) d-orbitals apply. Thus, there are two localized orbitals in the band gap close to the top of the valence band. These orbitals will act as acceptor levels, and the polymer will be a p-type at temperatures for which the band gap energy is large compared with $k_oT$. By using a combination of $Mg^{2+}$ centers and $Ca^{2+}$ centers, the valence band hole concentration can be controlled.

If the central moiety is a metal ion, $Fe^{2+}$, six valence electrons are available. The (n−1) $d(x^2-y^2)$ level will be filled. Since this level is in the band gap close to the bottom of the conduction band, it will act as a donor level. The polymer will be n-type at temperatures for which the band gap energy is large compared with $k_oT$. Again, by using a combination of $Mg^{2+}$ centers and $Fe^{2+}$ centers, the conduction band electron concentration can be controlled.

If the central moiety is the metallic ion, $Cu^{2+}$, nine valence electrons are available. As is shown in FIG. 3, the (n+1)s level is filled, and the (n+1)p-triplet is one-sixth filled. These electrons will go into the delocalized conduction band levels at the same energies. This is because the entropy of a delocalized electron is much greater than that of a localized electron. Since these electrons are in the conduction band even at absolute zero, this polymer is a metal. Once again, by using a combination of $Mg^{2+}$ centers and $Cu^{2+}$ centers, the conduction band electron concentration can be controlled.

It will be apparent by reference to FIG. 3 what the electrical properties will be for polymers using other metal centers and combinations of metal centers. Furthermore, the band gap energy can be changed by changing the structure of one or more of the ligands.

In general then, the conductive polymer comprises a set of ions or atoms interconnected in a three-dimensional network by conjugated ligands for which electronic conduction occurs around the ions or atoms by means of atomic overlaps, for which the conduction status is controlled by the distribution of the available valence electrons of the ion or atom in the available ionic (or atomic) orbitals, and for which the band gap energy is controlled in part by the choice of the ligands.

The ionic (or atomic) center can be specified by stating the element, the formal charge on the center, the coordination number of the center, and the geometry for such coordination. Thus, the i-th center can be represented by $$(E_i, c_i, g_i, CN_i)$$

where $E_i$ designates the element, $c_i$ designates the formal charge, $g_i$ designates the coordination geometry, and $CN_i$ designates the coordination number. Each ligand can be specified by stating the chemical structure of the ligand ($L_j$), the formal charge on the ligand ($c_j$) and the dentation of the ligand with respect to the m-th center to which it is bonded ($d_{jm}$). Thus, the j-th ligand can be represented by $$(L_j, c_j, d_{j1}, d_{j2}, \ldots, d_{jm_j})$$

where $m_j$ is the total number of centers to which the ligand is bonded.

If $p_i$ is the number of centers of the i-th kind, and if $q_j$ is the number of ligands of the j-th kind, the polymer (or a specific region thereof) can be represented by $$\pi_i p_i(E_i, c_i, g_i, CN_i) \, \pi_j q_j(L_j, c_j, d_{j1}, d_{j2}, \ldots, d_{jm_j})$$

Charge balance requires that $$\sum_i p_i c_i = \sum_j q_j c_j$$

Since the number of center bonds must be equal to the number of ligand bonds, it is required that $$\sum_i p_i CN_i = \sum_j q_j \sum_{n_j} d_{jm_j}$$

These concepts regarding ligands can be made clearer by discussing specific ligands. It should be noted that the ligands discussed below are cited only as examples and should not be taken as limiting the scope of this invention in any way. Start with 1,1-ligands, ligands which are bonded to two centers by mono-dentation in both cases. Some simple examples are

:N≡C—C≡N:,

:N≡C—C≡C:(−), (−):C≡C—C≡C:(−).

$\sigma$-bonding to the centers occurs by means of the N: or C: ligand atoms. The formal charges are 0, −1 and −2, respectively.

Other examples of zero formal charge 1,1-ligands are

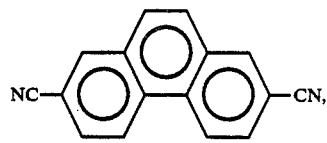

-continued
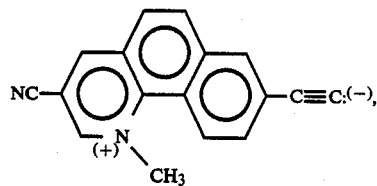
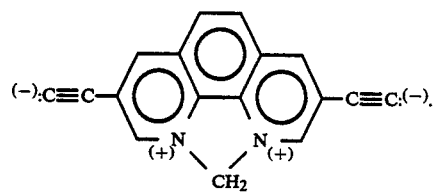
Modifications of these structures lead to 1,1-ligands with formal charges −3, +1, +2 and +3, respectively,
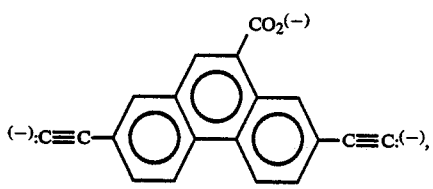
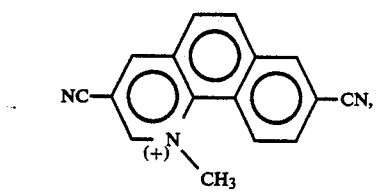
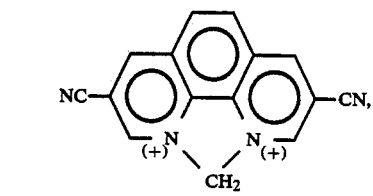
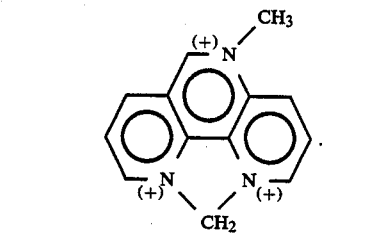
The following are examples of zero formal charge ligands which bond to more than two centers with mono-dentation bonds.
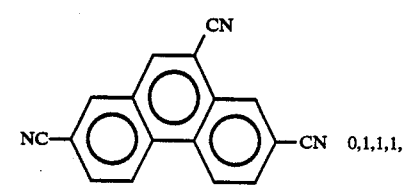 0,1,1,1,
-continued
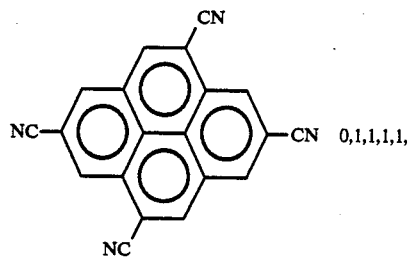 0,1,1,1,1,
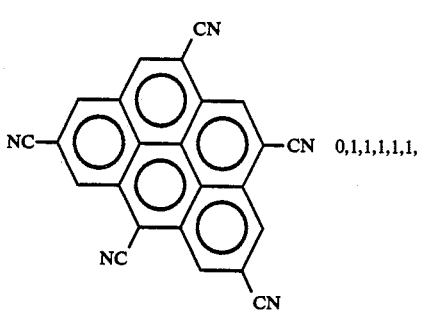 0,1,1,1,1,1,
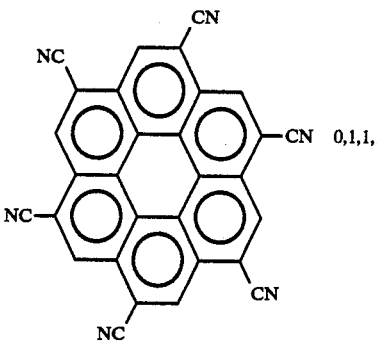 0,1,1,1,1,1,1.
The following are examples of bidentation ligands
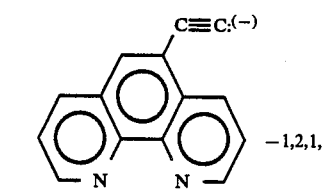 −1,2,1,
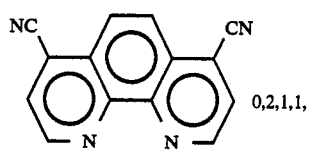 0,2,1,1,
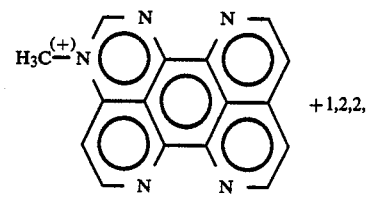 +1,2,2,

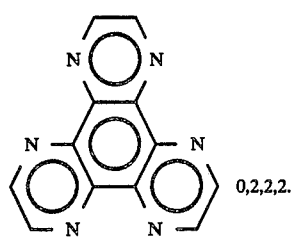

0,2,2,2.

Tridentation and tetradentation ligands are also possible as follows:

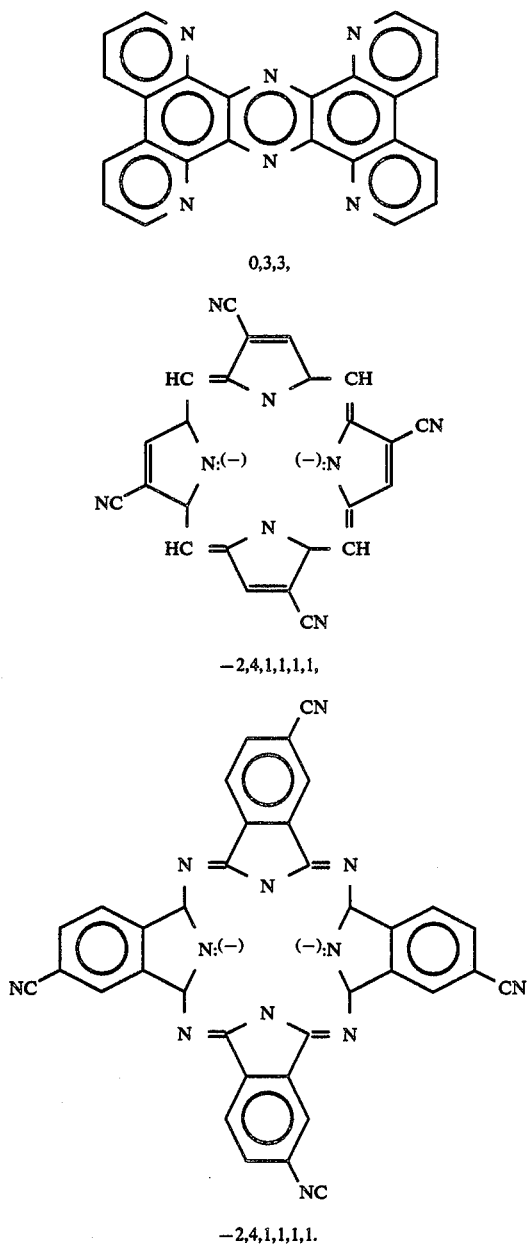

0,3,3,

−2,4,1,1,1,1,

−2,4,1,1,1,1.

The last structure above is not a misprint. The isonitrile structure as well as the nitrile structure can be used for monodentation. It should be noted that, as the conjugation within a ligand increases, the band gap decreases. The 0,1,1,1,1,1,1 and the −2,4,1,1,1,1 ligands produce polymers with much smaller band gaps than :N≡C—C≡N:, all other factors being equal.

While the bulk of the above discussion has been with respect to d-orbitals it should be clear that similar concepts hold with respect to f-orbitals. Such is not discussed at this time because it is simpler to speak in terms of the lighter atoms and ions having d-type orbitals. However, the invention is not limited to d-orbitals.

The invention will be better understood by reference to the following examples wherein certain octahedrally coordinated units are interconnected in accordance with the present invention to provide conductive polymers.

EXAMPLE I—ELECTROCHEMICAL SYNTHESIS

An aqueous solution is formulated containing approximately fifty percent (50%) by weight of tetramethylammonium tosylate (TMAT). The solution is formulated to be approximately one-tenth molar (0.1M) in hexa-aza-triphenylene (HAT) and approximately one-tenth molar (0.1M) in ferrous acetate.

An anode and a cathode are positioned in the solution and a potential of about 1±0.2 volts d.c. relative to a Standard Calomel Electrode is applied to the cathode. A polymer having the formula $[Fe°HAT]_x$ is deposited on the cathode. The structure of the polymer is (the dashed lines representing symmetry, not bonding, and only partial portions of the ligands being shown for clarity in understanding the symmetry of the structure of the polymer, the ligands being HAT.)

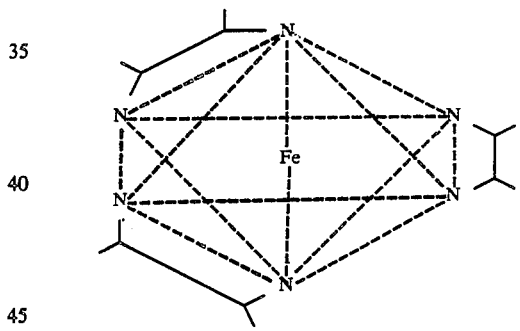

It exhibits resistivity in the range of 500 to 1000 μohm.cm.

Cobalt, zinc and nickel are similarly fabricated into HAT polymers which exhibit similar properties.

EXAMPLE II—LASER SYNTHESIS

Zinc and tricyanobenzene are heated to a temperature in the range of 500° C. to 700° C. The resulting vapor is irradiated with a UV laser having an energy selected to excite the $d_z{}^2$ electrons of zinc into the 5p orbitals. The vapor is also irradiated with a laser having an energy selected to excite the zinc $p_z$ electrons into the 5s orbital. With the zinc in the resulting state, reaction occurs to form zinc tetratricyanobenzene polymer having a resistivity in the range of 500 to 1000 μohm.cm.

EXAMPLE III—LASER SYNTHESIS OF SEMICONDUCTOR

Zinc, iron, magnesium and/or calcium is vaporized along with tricyanoethylene. The resulting vapor is irradiated with lasers of two distinct energies, as in Example II, to excite, for example, the zinc $d_{z^2}$ and $p_z$ electrons into, respectively, the 5p and 5s orbitals. Reaction then occurs to form a metallic or semiconducting polymer of the structure:

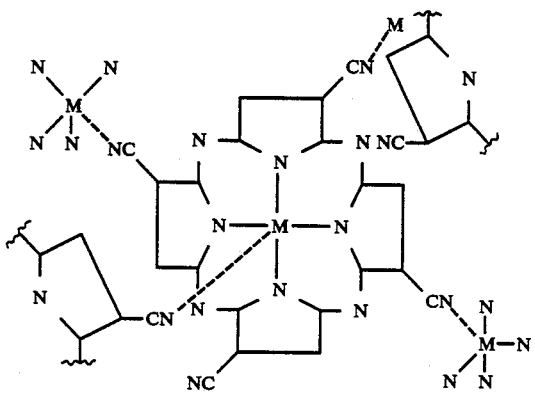

The zinc polymer is a metal. The iron polymer is an n-type semiconductor. The calcium polymer is a p-type semiconductor. The addition of magnesium to the other metal will reduce the conductivity.

Industrial Applicability

Conductive polymers are provided in accordance with the present invention. Such polymers provide controllable and designable conductive properties of great use to the design engineer of semiconductor devices or metallic materials. Specific usefulness is found in the design of semiconductor devices of selectable band gaps and junction profiles.

Although the foregoing invention has been described in some detail by way of illustration by specific embodiments thereof for the purposes of clarity of understanding, it should be recognized that a number of changes and modifications of the present invention may be practiced which will still fall within the scope of the invention and the scope of the appended claims.

I claim:

1. A conductive polymer comprising a plurality of interconnected units positioned in a three-dimensional array, each of which units comprises:
   a generally centrally positioned moiety, said moiety being a metal atom or ion, a phosporo halide, or a sulfuro halide and having valence level d-orbitals or f-orbitals; and
   a ligand or set of ligands having a total dentation capability of three or more non-coplanar dentations and being positioned about said centrally positioned moiety, at least two of said dentations being parts of conjugated systems, said ligand or set of ligands being dentated to said centrally positioned moiety via $\pi$-bonding of C, N or O atoms of said ligand or set of ligands, said C, N or O atoms having available p-orbitals for $\pi$-bonding; and
   wherein said units are interconnected by having at least one ligand in common and wherein the conjugation of said conjugated systems is via $\pi$-bonding and extends three-dimensionally from one centrally positioned moiety to an adjacent centrally positioned moiety.

2. A conductive polymer as set forth in claim 1, wherein a band gap, defined as the energy difference between the valence band and the conduction band, is sufficiently small so that large numbers of valence band electrons are in the conduction band at ambient temperature whereby the polymer is intrinsically conducting.

3. A conductive polymer as set forth in claim 1, wherein said moiety is a metal atom or ion.

4. A conductive polymer as set forth in claim 3, wherein the centrally positioned metal atom or ion has an available d- or f-orbital which is empty and which lies slightly above a top of the valence band whereby the polymer exhibits p-type semiconductor behavior.

5. A conductive polymer as set forth in claim 3, wherein the centrally positioned metal atom or ion has an available d- or f-orbital which is occupied and which lies slightly below a bottom of the conduction band whereby the polymer exhibit n-type semiconductor behavior.

6. A conductive polymer as set forth in claim 3, wherein the centrally positioned metal atom or ion has an available d- or f-orbital which is empty and which lies in the valence band whereby the polymer exhibits p-type metal conductor behavior.

7. A conductive polymer as set forth in claim 3, wherein the centrally positioned metal atom or ion has an available d- or f-orbital which is occupied and which lies in the conduction band whereby the polymer exhibits n-type metal conductor behavior.

8. A conductive polymer as set forth in claim 1, wherein said two dentations which are parts of said conjugated systems each include an atomic orbital which is a part of a respective one of the conjugated systems of said two dentations, said atomic orbitals overlapping sufficiently so that the overlap integral of said atomic orbitals is greater than or equal to 0.1.

* * * * *